(12) United States Patent
Nenna et al.

(10) Patent No.: US 11,383,880 B2
(45) Date of Patent: Jul. 12, 2022

(54) INTERNALLY HOLLOW BODY, MOULD AND MANUFACTURING METHOD THEREOF

(71) Applicants: Umberto Nenna, Brescia (IT); Fabrizio Poli, Brescia (IT)

(72) Inventors: Umberto Nenna, Brescia (IT); Fabrizio Poli, Brescia (IT)

(*) Notice: Subject to any disclaimer, the term of this patent is extended or adjusted under 35 U.S.C. 154(b) by 45 days.

(21) Appl. No.: 15/533,933

(22) PCT Filed: Nov. 27, 2015

(86) PCT No.: PCT/IB2015/059175
§ 371 (c)(1),
(2) Date: Jun. 7, 2017

(87) PCT Pub. No.: WO2016/092407
PCT Pub. Date: Jun. 16, 2016

(65) Prior Publication Data
US 2017/0334601 A1 Nov. 23, 2017

(30) Foreign Application Priority Data
Dec. 11, 2014 (IT) .......................... BS2014A000205

(51) Int. Cl.
*B65D 8/00* (2006.01)
*B29C 45/00* (2006.01)
(Continued)

(52) U.S. Cl.
CPC .......... *B65D 11/04* (2013.01); *B29C 45/0062* (2013.01); *B29C 45/26* (2013.01);
(Continued)

(58) Field of Classification Search
CPC .... B65D 11/04; B65D 23/10; B65D 21/0231; B65D 41/023; B29C 45/0062
See application file for complete search history.

(56) References Cited

U.S. PATENT DOCUMENTS 2,084,056 A * 6/1937 Costello ................. B65D 23/02
215/2
3,940,011 A * 2/1976 Dubois ..................... B65D 1/12
220/604
(Continued)

FOREIGN PATENT DOCUMENTS

CN    1541903 A    11/2004
DE    297 22 224 U1    2/1998
(Continued)

OTHER PUBLICATIONS

International Search Report and Written Opinion of the International Searching Authority for corresponding International Patent Application No. PCT/IB2015/059175 dated Apr. 6, 2016, 12 pgs.

*Primary Examiner* — Jeffrey R Allen
(74) *Attorney, Agent, or Firm* — Merchant & Gould P.C.

(57) ABSTRACT

A plastic internally hollow body has a cavity for containing liquids, solids or gases, and includes a main body shaped and having an inner surface at least partially defining the cavity. The inner surface terminates in a shaped edge that delimits a coupling aperture to the cavity. The internally hollow body includes a closure body, having an outer sealing surface suitable at least partially engaging the inner surface of the main body. The closure body at least partially closes the cavity in correspondence of the coupling aperture. The main body is joined to the closure body at least partially along the shaped edge by a joining element over-moulded to the main body and the closure body and covering the over-moulding seat resulting between the main body and the closure body. A method for making the internally hollow body over-moulds the joining element by injection moulding with an over-moulding mould.

22 Claims, 10 Drawing Sheets

(51) Int. Cl.
*B29C 45/26* (2006.01)
*B65D 21/02* (2006.01)
*B65D 23/10* (2006.01)
*B65D 41/02* (2006.01)
*B29L 31/00* (2006.01)
*B63B 22/00* (2006.01)
*B63C 9/08* (2006.01)

(52) U.S. Cl.
CPC ......... *B65D 21/0231* (2013.01); *B65D 23/10* (2013.01); *B65D 41/02* (2013.01); *B29L 2031/712* (2013.01); *B29L 2031/7172* (2013.01); *B63B 22/00* (2013.01); *B63C 9/08* (2013.01)

(56) References Cited

U.S. PATENT DOCUMENTS

| | | | | |
|---|---|---|---|---|
| 4,805,793 | A | * | 2/1989 | Brandt ............... B65D 21/0231 206/509 |
| 2004/0134871 | A1 | * | 7/2004 | Yaita ................... B29C 45/0062 215/43 |

FOREIGN PATENT DOCUMENTS

| | | |
|---|---|---|
| EP | 1 138 605 A2 | 10/2001 |
| EP | 1 433 584 A1 | 6/2004 |
| FR | 2 930 475 A1 | 10/2009 |
| JP | H10-218255 A | 8/1998 |
| JP | 2007-131310 A | 5/2007 |

* cited by examiner

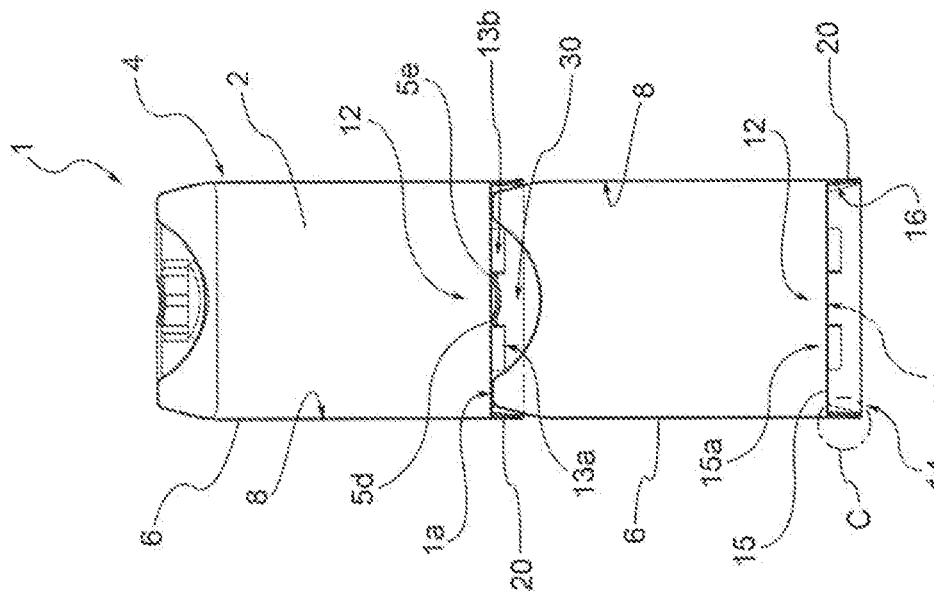
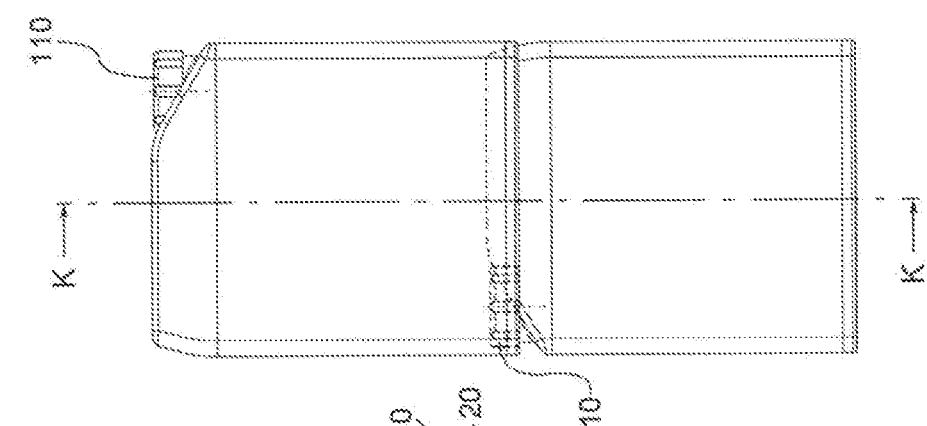
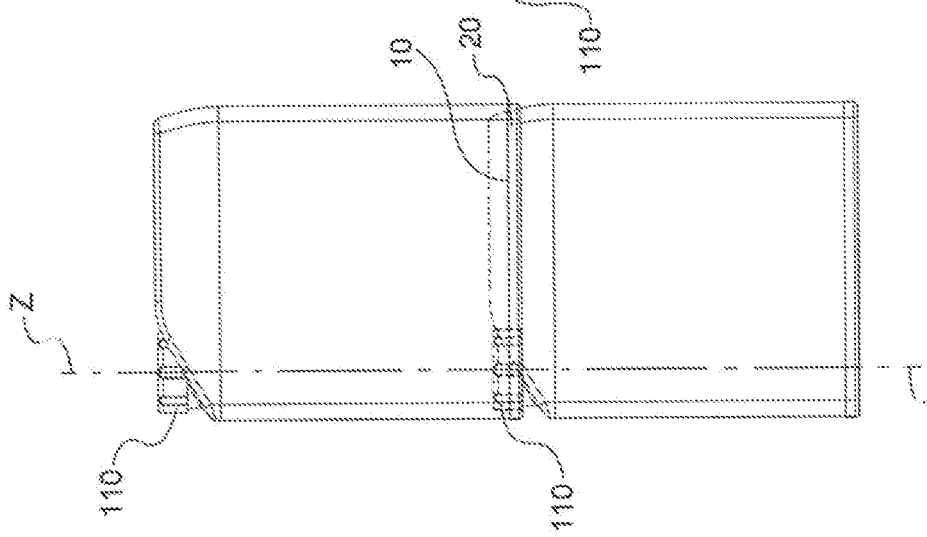

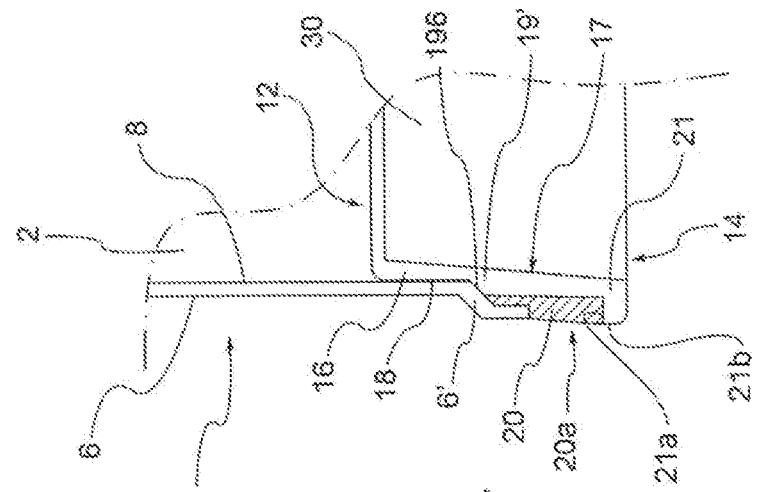
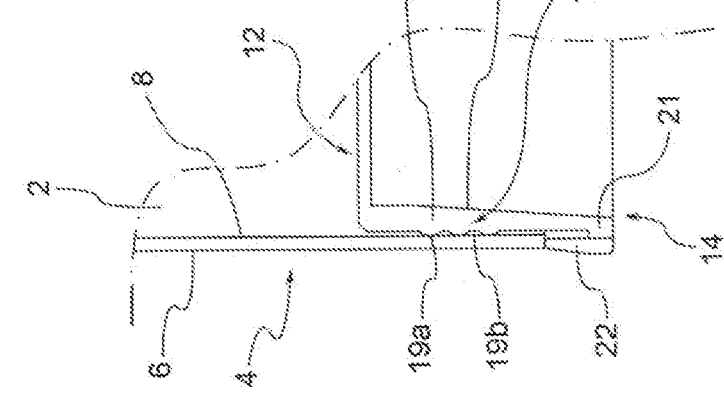
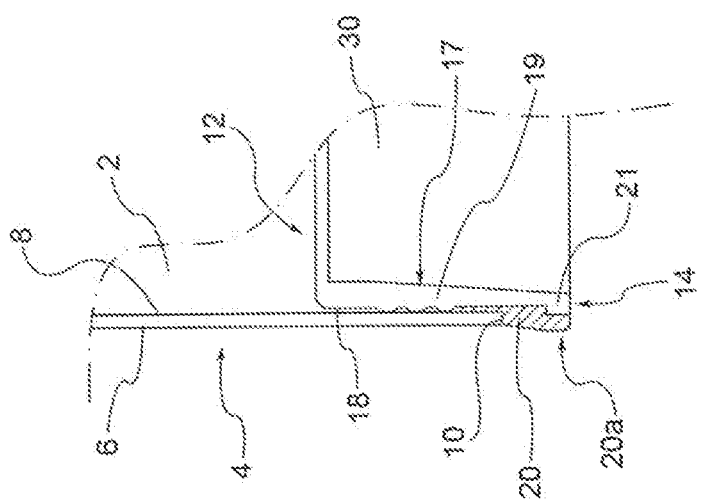

INTERNALLY HOLLOW BODY, MOULD AND MANUFACTURING METHOD THEREOF

This application is a National Stage Application of PCT/IB2015/059175, filed 27 Nov. 2015, which claims benefit of Serial No. BS2014A000205, filed 11 Dec. 2014 in Italy and which applications are incorporated herein by reference. To the extent appropriate, a claim of priority is made to each of the above disclosed applications.

BACKGROUND OF THE INVENTION

This invention relates in general to the production of internally hollow bodies. In particular, the invention relates to internally hollow bodies made of plastic, such as for example containers, and the manufacturing method of the same.

In the art, hollow plastic containers are known made using rotational moulding or blow moulding techniques and intended to contain a plurality of liquid, solid or gaseous substances in multiple industrial sectors (food, chemical, pharmaceutical, etc.). For example, this type of containers includes those intended to contain substances that must not come out in an uncontrolled manner and that, therefore, must be provided with closing systems (screw caps, snap-on lids, valves, etc.).

The internally hollow bodies, such as the aforementioned containers, and the production techniques known today, have some disadvantages.

The internally hollow bodies of the prior art produced using traditional moulding techniques (rotational moulding or blow moulding), such as bottles, drums, tanks, wineskins, barrels, cans, cisterns have the disadvantage of being difficult to make in square shapes, for example box-shaped or approximable to those of a parallelepiped with slightly rounded edges. In addition, they generally have a worse exterior finish than the aesthetic finish of products manufactured using the injection moulding technique.

Moreover, blow moulding does not allow the realisation of details with constant thickness and, consequently, products made with this technology have areas that require a greater amount of plastic material for the manufacture of the container, with a consequent greater demand for resources (financial and material). Furthermore, blow-moulding technology and, in particular, rotational moulding technology are less productive than other technologies, such as injection moulding.

SUMMARY OF THE INVENTION

The purpose of this invention is to provide an internally hollow plastic body, made at least partly by injection moulding, that allows overcoming the aforesaid drawbacks.

BRIEF DESCRIPTION OF THE DRAWINGS

The characteristics and advantages of this invention will be apparent from the following description, given by way of non-limiting example, in accordance with the accompanying figures, wherein:

FIG. 4 shows a side view of two internally hollow bodies according to an embodiment of the invention stacked one on the other, with the same stacking direction;

FIG. 4a shows a side view of two internally hollow bodies according to an embodiment of the invention stacked one on the other, but with opposite stacking direction with respect to the stacking direction of FIG. 4;

FIG. 4b shows a sectional view of the two stacked internally hollow bodies of FIG. 4a on the section plane K-K;

FIGS. 6 and 6a show an enlarged detail, of area C in FIG. 4b, of the internally hollow body according to a further embodiment variant of this invention, respectively with and without the joining element;

FIG. 7 shows an enlarged detail, of area C in FIG. 4b, of the internally hollow body according to another embodiment variant of this invention;

DETAILED DESCRIPTION OF THE PREFERRED EMBODIMENTS

Figure 1A:
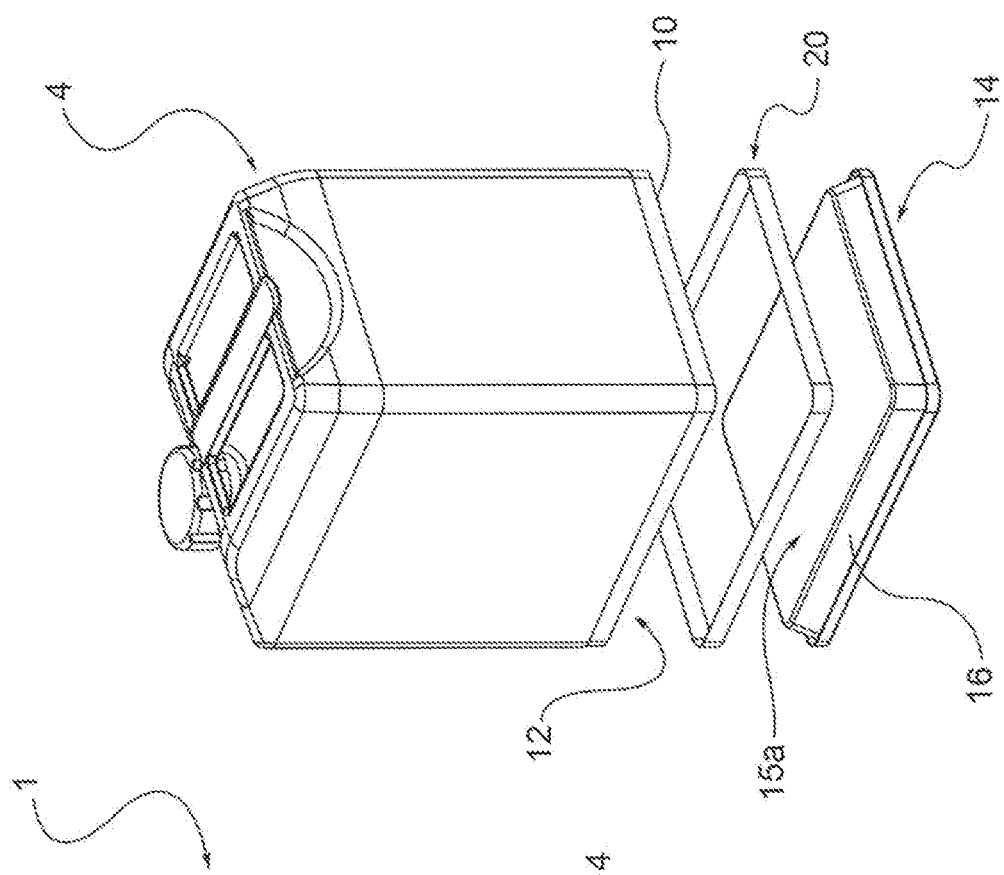
FIG. 1a is an exploded view of the internally hollow body according to an embodiment of this invention.

In accordance with the accompanying figures, numeral 1 generally indicates an internally hollow body made of plastic, having a cavity 2, preferably suitable to contain liquid, solid or gaseous material.

The term "internally" means that the cavity of the hollow body is internal to the body, which is to say that, for example, the body has an inner surface that defines, at least partially, said cavity and that is in contact with a liquid, solid or gaseous material that flows, or is contained, at least partially, in the cavity, and an outer surface of the hollow body that, instead, is in contact with the external environment or, for example, with a different or other element with respect to that contained, or that flows, in the cavity. This type of internally hollow bodies includes, for example conduits, channels, pipes or container bodies.

The internally hollow body 1 comprises a main body 4 shaped so as to comprise side walls 6, having an inner surface 8 which at least partially defines said cavity 2 and which ends with a shaped edge 10 which delimits a coupling aperture 12 to the cavity 2. The internally hollow body 1 comprises a closure body 14, comprising closure side walls 16 having an outer sealing surface 18. This outer sealing surface 18 is suitable to engage at least partially with the inner surface 8 of the side walls 6 of the main body 4 and the closure body 14 is suitable to at least partially close the cavity 2 at the coupling aperture 12.

Figure 1:
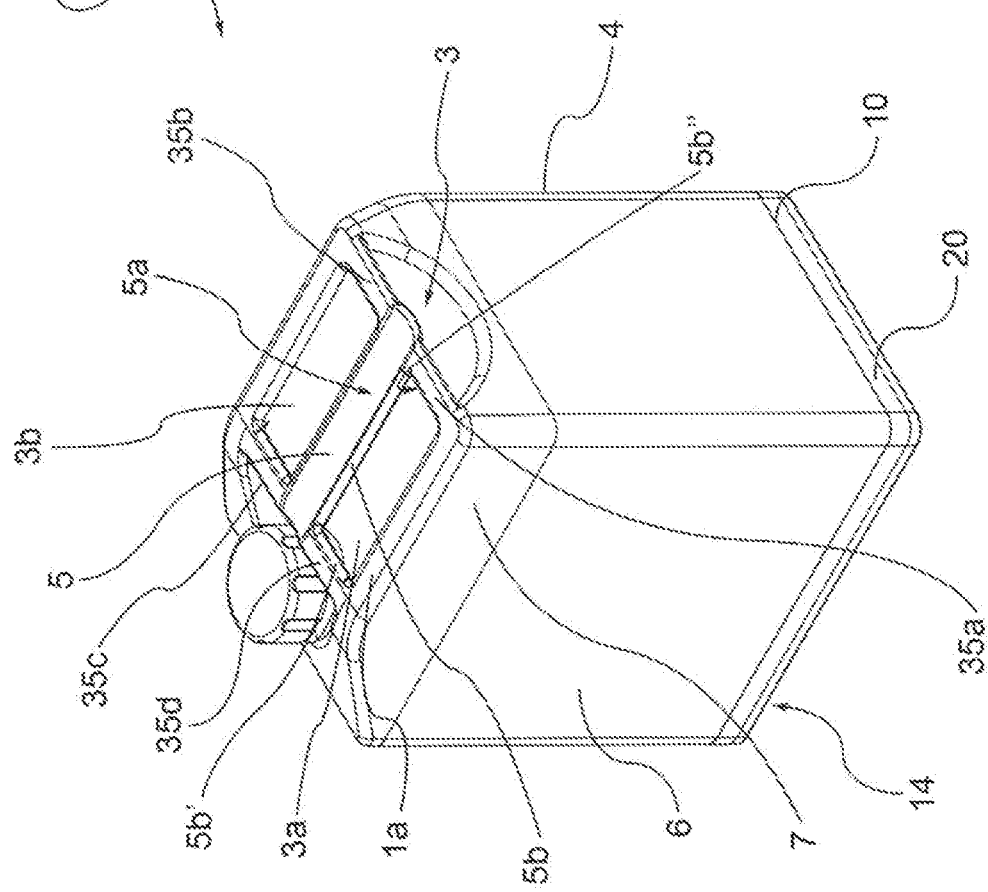
FIG. 1 shows an internally hollow body according to an embodiment of this invention.
Figure 2:
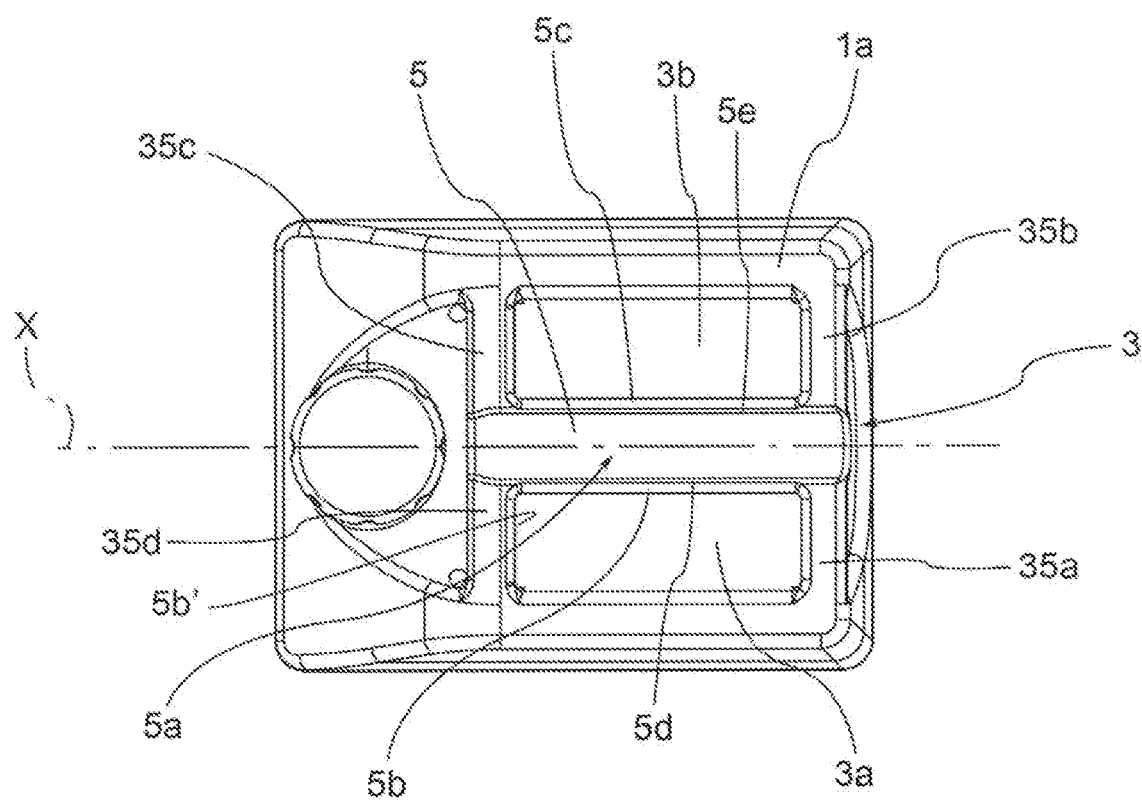
FIG. 2 shows a top view of the internally hollow body of FIG. 1.
Figure 2A:
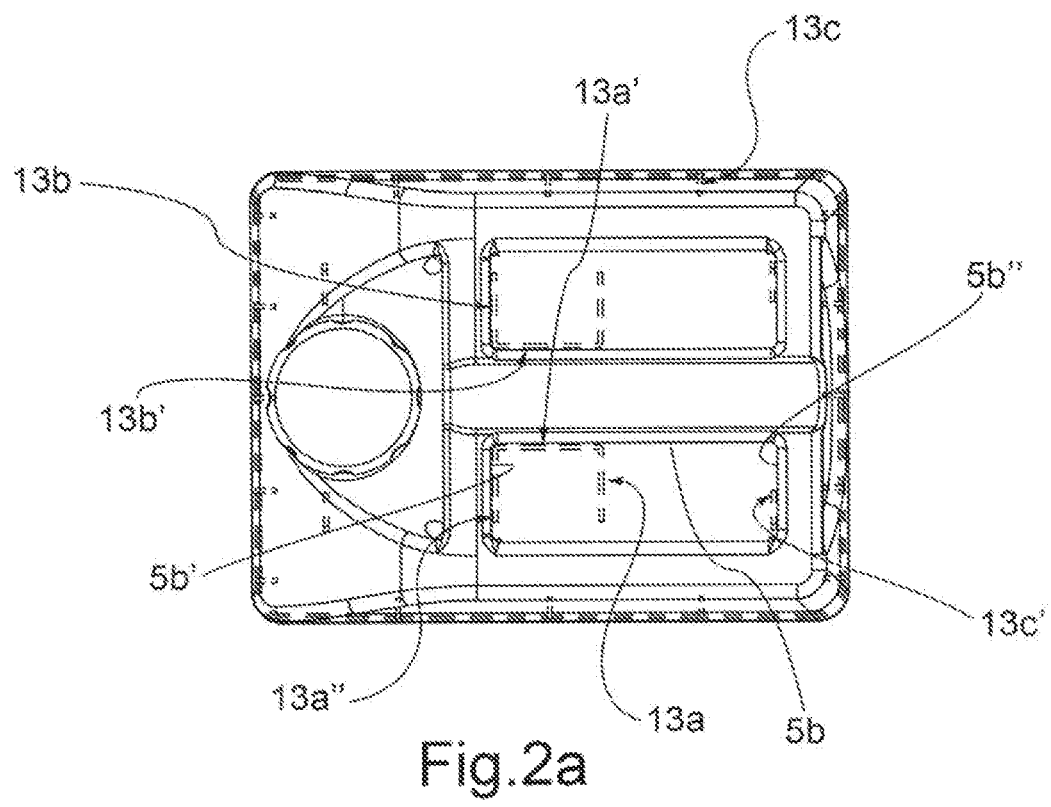
FIG. 2a shows, with a continuous line, a top view of a first internally hollow body and, with a dashed line, a closure body and a set of coupling guides of a second internally hollow body, stacked and surmounting the first.
Figure 8A:
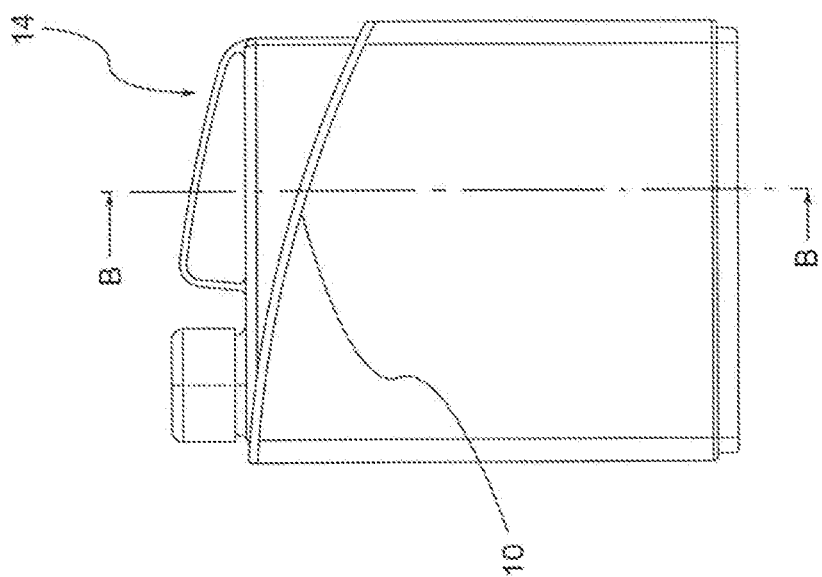
FIG. 8a shows a side view of the internally hollow body of FIG. 8.
Figure 8:
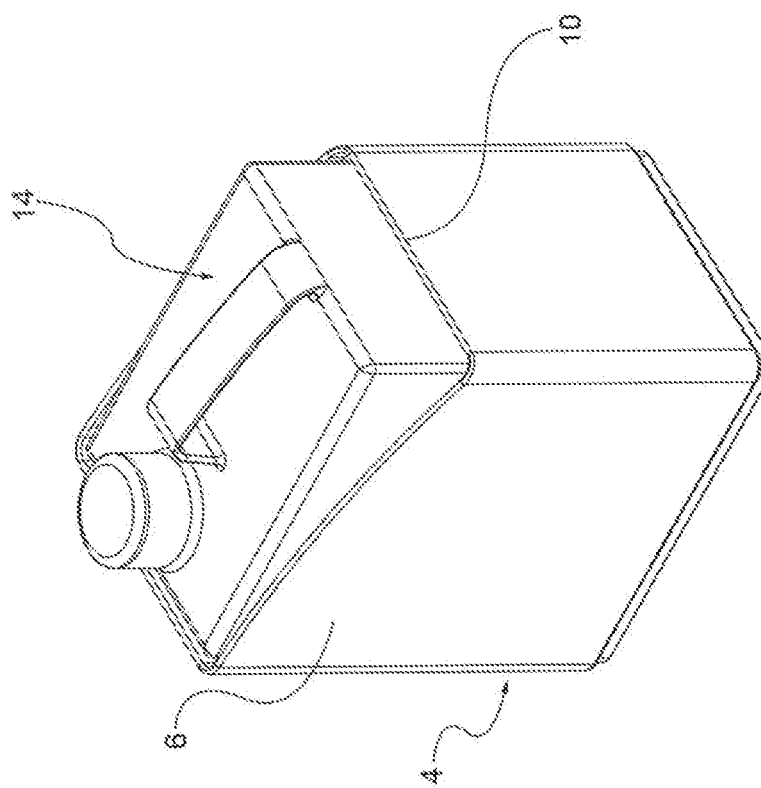
FIG. 8 shows an internally hollow body according to a further embodiment of this invention.
Figure 9:
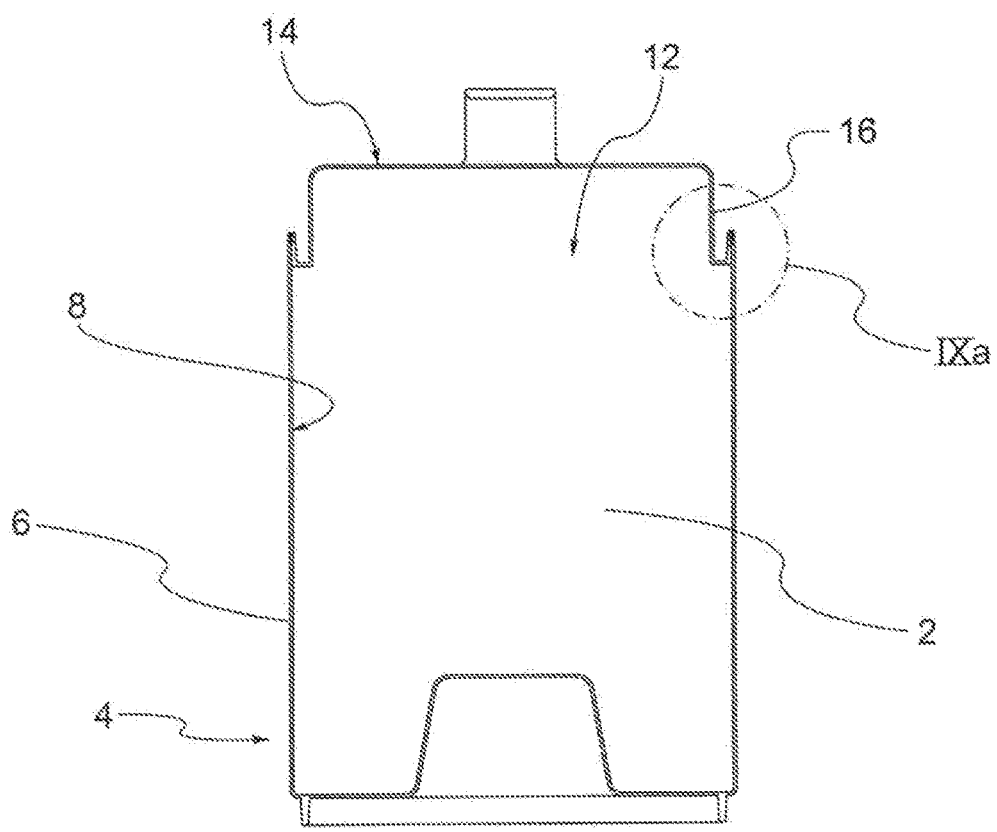
FIG. 9 shows a sectional view of the internally hollow body according to the embodiment of FIG. 8a on the plane B-B.
Figure 9A:
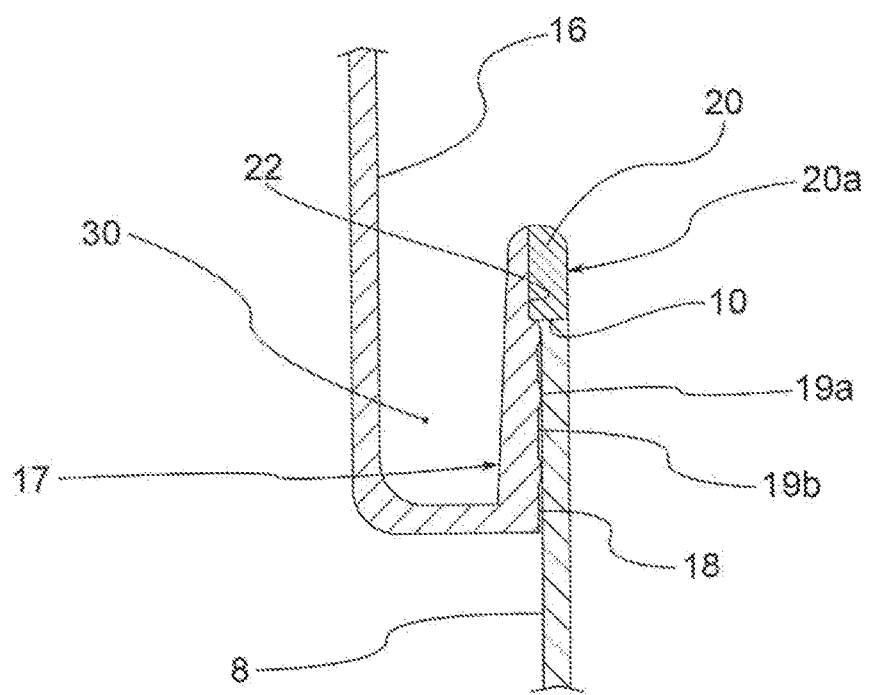
FIG. 9a shows an enlarged detail of the section of the internally hollow body according to the embodiment of FIG. 9.

For example, such closure body 14 is the bottom of a container, as in the embodiment shown in FIG. 1 and FIG. 1*a*, or the cover, as in the embodiment shown in FIGS. 8 to 9, or one of the two half-shapes that, when joint, form the entire internally hollow body, or a simple portion of the internally hollow body or an ancillary portion (for example a handle of a container, an inlet mouth and the like).

Additionally, the internally hollow body 1 comprises a joining element 20, also made of plastic.

Preferably, the plastic material with which the joining element 20 is made is suitable to melt and weld with the plastic material with which the main body 4 or the closure body 14 is made. For example, the joining element is made of the same plastic material as the main body 4 and/or the closure body 14 or with a plastic different but suitable to melt with the plastic of the closure body 14 and/or of the main body 4. In the case where the joining element is made of the same plastic material as the main body and the closure body, this joining element is substantially melted with the two bodies (main and closure) and cannot be easily distinguishable from them. In an embodiment, the plastic material that constitutes the joining element is translucent or transparent so as to allow seeing through it, for example, to view the contents inside the cavity 2 of the hollow body.

The term plastic material or plastic means a polymer, for example a synthetic resin, or an elastomer, or a thermoplastic or thermosetting polymer preferably selected from the group of polyethylenes, polypropylenes, methacrylates, polycarbonates or polyamides.

Between the main body 4 and the closure body, there is an over-moulding seat 22 and the joining element 20 is over-moulded by injection to the main body 4 and the closure body 14, covering this over-moulding seat 22. It follows that the main body 4 is joined to the closure body 14 at least partially along the shaped edge 10 by means of said joining element 20 or preferably along the entire shaped edge 10.

Preferably, the over-moulding of the joining element 20 on the closure body 14 and on the main body 4 is made by injection moulding, for example through a step of injection moulding of a synthetic resin melted in the over-moulding seat 22, when the closure body 14 and the main body 4 are mutually coupled and inserted in a mould 500 for over-moulding the joining element 20.

Preferably, the joining element has at least one outer surface portion 20*a* free from contact with the closure body 14 and/or with the main body 4, which also has an edging effect, for example with a different colour than the rest of the hollow body.

Preferably, the closure body 14 is suitable to completely close the cavity 2 in a sealing manner at the coupling aperture 12. In this way, hollow containers are created able, for example, to contain liquid, solid or gaseous substances, such as jars, barrels, jerry cans, flasks, bins, tanks, floats, buoys, lifebuoys, fenders, small cisterns, or bottles, in which the closure body 14 is preferably the bottom or the cover of such containers. In the case of internally hollow bodies for which, once closed, it is not necessary to access the internal cavity again, such as floats, buoys, lifesavers or fenders, for example, the closure body 14 and the main body 4 respectively represent each of the two half-shells (preferably equal to each other) to be united by the joining element to form the buoy, float, lifesaver or fender.

Preferably, the closure body 14 has a mould coupling cavity 30 in which a mould 500 for injection moulding is at least partially coupleable according to shape coupling, suitable to counteract the pressure generated on the over-moulding seat 22 by injection means on the over-moulding seat 22 during an over-moulding step of the joining element 20. This mould coupling cavity 30 is preferably formed externally to the cavity 2 of the hollow body 1, i.e., is delimited at least partially by the outer surface of the closure body opposite to the surface facing the cavity 2 of the hollow body. In other words, the mould coupling cavity 30 is defined at least partially by the outer surface suitable to be in contact with the outside environment or with an element other than what is contained or flows in the cavity 2. For example, this mould coupling cavity 30 is delimited by the inner closure surface 17 of the closure side walls 16 of the closure body, opposite to the outer sealing surface 18 towards the mould coupling cavity 30. In this way it is avoided that, during the over-moulding step, the injection of the resin forming the joining element 20, causes a disengagement between the outer sealing surface 18 of the closure body 14 and the inner surface 8 of the side walls 6 the main body 4.

Figures 5, 5A:
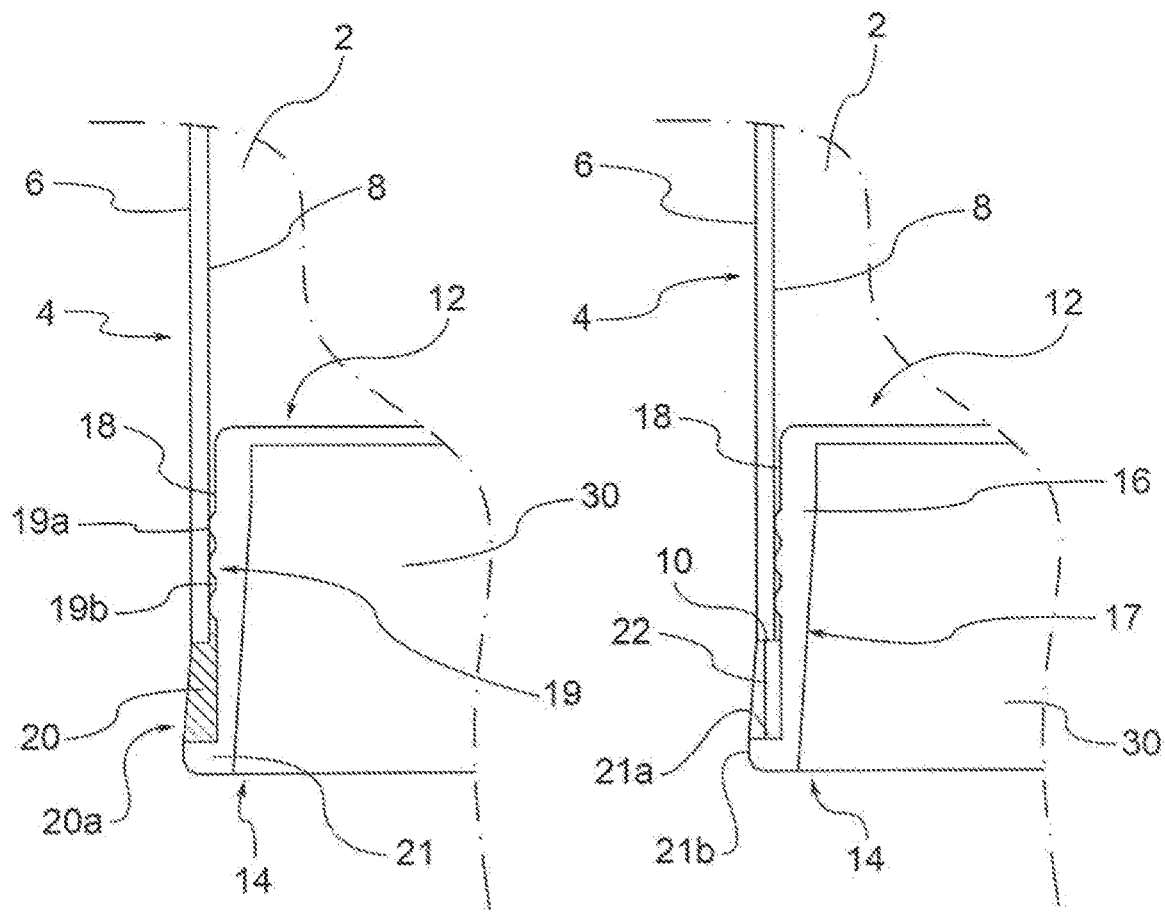
FIGS. 5 and 5a show an enlarged detail, of area C in FIG. 4b, of the internally hollow body according to an embodiment variant of this invention, respectively with and without the joining element.
Figure 5B:
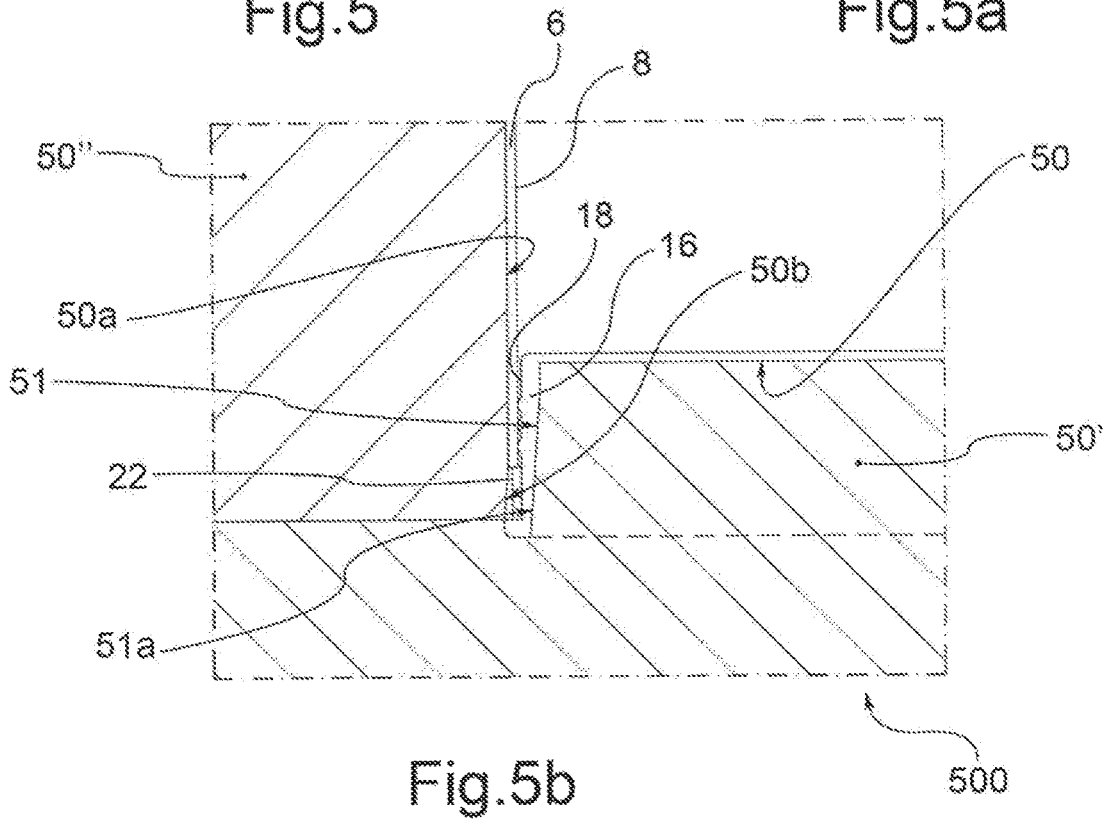
FIG. 5b shows an enlarged detail, of area C in FIG. 4b, of the internally hollow body according to an embodiment variant of this invention, when inserted between punch and matrix during an over-moulding step.
Figure 5C:
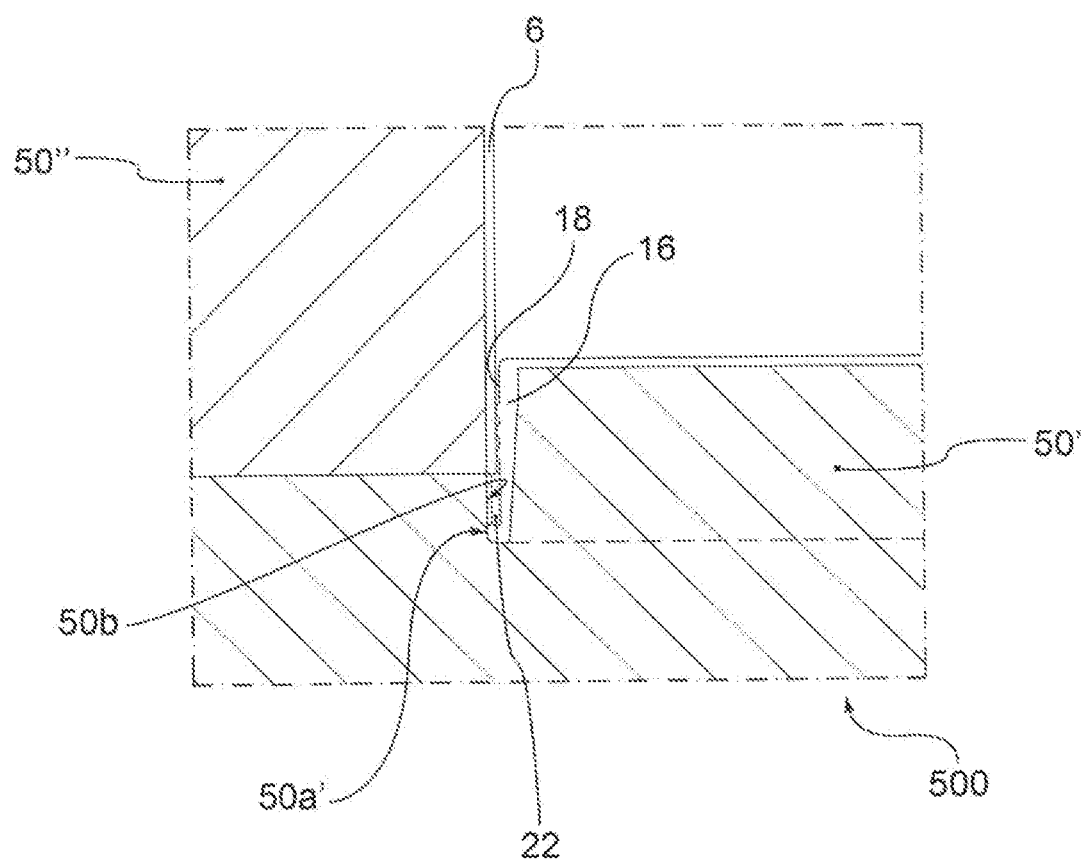
FIG. 5c shows an enlarged detail, of area C in FIG. 4b, of the internally hollow body according to another embodiment variant of this invention, when inserted between punch and matrix during an over-moulding step.

Preferably, as shown for example in FIGS. 5*b* and 5*c*, the inner closure surface 17 that defines the mould coupling cavity 30 is facing the opposite side with respect to the cavity 2. It follows that the mould 500 engages the mould coupling cavity 30 externally with respect to the cavity 2 of the hollow body 1 obtained at the end of the moulding step. In this way, the moulding steps are reduced and it is also possible to produce totally closed hollow bodies 1. In fact, if the mould coupling cavity 30 were formed from the part of the cavity 2 of the hollow body 1, in the case of totally closed hollow bodies, the mould portion inside the mould cavity 30 and the cavity 2 would not allow the total closure of the hollow body 1. In fact, in this latter case, it would be necessary to leave a free access to the cavity 2 to remove the mould 500 (or part of it, for example, the matrix or the punch).

Mould 500 means a mould for injection moulding, for example formed by a punch 50' and a matrix 50". As a consequence, preferably a part of the walls that form the punch and/or a part of the walls that form the matrix are suitable to counteract the pressure generated on the over-moulding seat 22 by the injection means during an over-moulding step of the joining element 20. For example, the main body 4 is inserted in the matrix 50" of the mould 500 according to shape coupling and the closure body 14 is inserted into the punch 50' of the mould 500 according to shape coupling.

Preferably, a matrix side wall 50*a* and/or a punch side wall 50*a*' is at least partially in contact with the synthetic resin during the over-moulding step of the joining element and in addition to counteracting the pressure during the step of the injection of the resin synthetic, such matrix side wall 50*a* or punch side wall 50*a*' defines an outer closure wall of the over-moulding seat 50*b* of the joining element. In this way, once the over-moulded synthetic resin solidifies, in correspondence of this outer closure wall of the over-moulding seat 50b, the outer surface portion 20a of the joining element 20 is formed.

In an embodiment, the mould coupling cavity 30 comprises an abutment surface 50 suitable to receive in abutment a portion of the mould and the side walls forming the inner closure surface 17 on which the walls of the mould 51 engage, at least partially, to counteract the pressure generated by the injection means during the step of over-moulding the joining element 20.

Preferably, the mould coupling cavity 30 has a truncated pyramid shape, whose minor base is the abutment surface 50 of the mould and the side walls of the truncated pyramid are the inner closure surface 17 on which the walls of the mould 51 engage to counteract the pressure generated by the injection means during the step of over-moulding the joining element 20. Preferably, one wall of the punch or the matrix rests on the abutment surface 50. "Walls" of the mould 51 means at least one portion of the walls that constitute the punch 50' and/or the matrix 50".

In an embodiment variant, the outer sealing surface has protrusions 19, for example in a repeated and alternating form of reliefs 19a and valleys 19b that form a corrugated surface near the coupling zone between the main body 4 and the closure body 14.

In an embodiment variant, alternating or in conjunction with the protrusions 19, in correspondence of the coupling zone between the main body 4 and the closure body 14, the outer sealing surface 18 forms a sealing step 19' which projects in the opposite direction to the inner closure surface 17 and which couples with a respective wall step 6' made on the side walls 6 of the main body 4. Preferably, the sealing support surface 196 of the sealing step 19' and the wall step 6' is inclined or parallel with respect to the direction perpendicular to the outer sealing surface 18 or to the inner surface 8 of the side walls 6.

Both solutions of the variants described above (protrusions 19 and/or sealing step 19'), allow effectively preventing and avoiding that the molten synthetic resin of the joining element 20 leaks between the sealing surface 18 of the closure body 14 and the inner surface 8 of the side walls 6 of the main body 4, during the step of over-moulding the joining element 20, thereby avoiding the entry of resin into the cavity 2.

In an embodiment, the closure side walls 16 form a support step 21, having a tread surface 21a that faces towards the shaped edge 10 and that extends perpendicularly or at an incline to the sealing surface and that is in contact with a wall of the joining element 20. In addition, in this embodiment the riser surface 21b is in contact with the outside; while, in another embodiment variant, the riser surface 21b is surmounted by the joining element 20 or in contact with it (for example as shown in FIG. 6).

Preferably, the joining element 20 completely fills the over-moulding seat 22, so as to allow the stable welding between the main body 4 and the closure body 14.

Preferably, also, the over-moulding seat 22 is delimited at the bottom by the tread surface 21a of the support edge 21, laterally by at least a part of the sealing surface 18 and at the top by at least a part of the inner surface 8 of the side walls 6 of the main body 4 and/or the shaped edge 10 and/or the sealing surface 18 thereof.

Preferably, also, the joining element 20 annularly surrounds the internally hollow body 1, creating a welding and sealing ring between the main body 4 and the closure body 14.

In an embodiment, for example when the internally hollow body is a container, in the upper part of the container (on the main body 4 or the closure body 14) a groove 3 is formed having two gripping seats 3a and 3b, suitable to accommodate the fingers of a hand. Between the two gripping seats, there is a handle 5 joined to the side walls of the main body 4 or the closure body 14. In this way, the two gripping seats 3a and 3b allow inserting the fingers of the hand in the groove 3 and grasping the handle 5, which therefore serves for the transport of the container, this handle 5 being firmly united to the container. For example this handle 5 is obtained during the step of moulding the main body 4 or the closure body 14 of the container.

In the embodiment in which the handle 5 is formed on the main body, the handle 5 lies on a plane substantially parallel to the plane of the bottom wall 15 of the container and has an upper gripping surface 5a, preferably flat and lying on the same plane of the upper surface of the container 1a, which delimits the overall dimensions of the container on top. Alternatively, the upper gripping surface 5a is slightly concave, but at least one of the edges 5d or 5e of the concave surface lies on the same plane of the upper surface of the container 1a. In this way, the upper gripping surface 5a or at least one of the edges 5d, 5e, together with the upper container surface 1a create a support surface suitable to receive the bottom of another similar container, allowing stacking. In addition, the handle 5, comprises a first gripping side surface 5b and a second gripping side surface 5c, each facing respectively one of the two gripping seats 3a and 3b.

Preferably, the handle is joined to the side walls of the main body 4 by means of four cross members 35a, 35b, 35c, 35d, arranged in pairs along two parallel lines. Each pair of cross members 35a, 35b and 35c, 35d connects one of the two ends of the handle 5 with the side walls of the container, and in particular each of the cross members within the pair connects one of its ends with one of the side walls of the container and its other end with the handle.

Preferably, the edges of the gripping seats 3a and 3b and the edges of the groove 3, are rounded for improved ergonomics and ease of grip.

In the embodiment wherein the closure body 14 or the main body 4 also serves as the bottom of a container, such main body 4 or closure body 14 comprises a bottom wall 15, preferably integral with the closure side walls 16, having an upper bottom surface 15a, which faces the cavity 2 of the container and which forms the inner bottom surface of the container. The bottom wall 15 further comprises an outer bottom surface 15b, opposite to the upper bottom surface 15a, not communicating with the cavity 2, but facing towards the outside of the container.

On the outer bottom surface 15b are formed coupling guides 13 that extend downwards, in the opposite direction with respect to the upper bottom surface 15a and perpendicularly to it, i.e., towards the outside of the container.

These coupling guides 13 are suitable to stabilise the containers when they are stacked one on the other.

In particular, the coupling guides 13 preferably comprise at least a first gripping guide 13a and/or at least one second gripping guide 13b and/or at least one seat constraint element 13c' suitable to be inserted in the gripping seats 3a and 3b of the underlying container, and/or rest walls 13c that engage in contact with the outer surface 7 of the side walls 6 of the underlying container, so as to stabilise stacking even more.

The coupling guides 13 are suitable to receive in support at least part of the surfaces that constitute the handle 5 and/or a part of the seat walls 5b', 5b'' that delimit each gripping seat 3a, 3b and/or the surfaces of the upper or side walls of the container when one or more containers are stacked one on the other (such as, for example, in FIGS. 4 and 4a). In this way, the coupling guides 13 are suitable to prevent the translation and sliding on the support plane of the container that surmounts the container on which it is stacked, allowing a more stable stacking of the containers.

Preferably, when the containers are stacked, the outer bottom surface 15b of the surmounting container is in contact with the upper container surface 1a and the upper gripping surface 5a and/or with the edges 5d, 5e of the container placed below and, in addition, such surfaces 1a, 5a and/or the edges 5d, 5e constitute the support plane.

Preferably, the first gripping guide 13a and/or the second gripping guide 13b, are each constituted by three walls arranged for example in a "C"-shape. In particular, a first guide wall 13a' of the first gripping guide 13a is in contact with the first lateral gripping surface 5b and a second guide wall 13b' of the second gripping guide 13b is resting on the second lateral gripping surface 5c, so as to constrain the translation movement of the container along the direction orthogonal to the main longitudinal axis of the handle X.

Preferably, also, the other two walls of the first 13a and second gripping guides 13b are supported by at least one of the walls that delimit the gripping seats 3a and 3b, so as to constrain the remaining possible translations on the support plane between the two containers. For example, a second guide wall 13a" of the first gripping guide 13a forming the "C"-shape is resting at least partially on a seat wall 5b' that delimits the gripping seat 3a orthogonally to the lateral gripping surface 5b. In this way, when two or more containers are stacked one on the other, the support of the second guide wall 13a" of the container mounting on the seat wall 5b' of the underlying container, constrains the translational movement of the containers along the direction parallel to the main longitudinal axis of the handle X. The same translation constraint parallel to the main longitudinal axis of the handle X, but in the opposite direction, is guaranteed by the presence of the seat constraint elements 13c', for example in the form of small walls, which are suitable to lean against the seat wall 5b" of the underlying container opposite the seat wall 5b' on which rests the second guide wall 13a".

The embodiment described above is suitable to allow the stacking of the containers in a stable manner in both a configuration in which the containers are all stacked in the same stacking direction, i.e., in such a way that, for containers identical to each other, each wall of the surmounting container is aligned to the equal and homologous wall of the underlying container, and with opposite stacking direction, i.e., with the surmounting container rotated 180° with respect to a configuration with the same stacking direction. In other words, the surmounting container is rotated 180° with respect to the container immediately below it along its vertical centreline axis K-K.

For example, in the case in which the container has a closure cap 110 as shown in FIGS. 4 and 4a, when the containers are stacked with the same stacking direction, the caps of the containers are all aligned along a vertical axis Z-Z coincident for all caps, when instead the containers are stacked with opposite direction, each cap of the overlying container is positioned on the opposite side of the cap of the container immediately below with respect to the vertical centreline plane of the container, passing through the centreline axis K-K.

Preferably, the fact that the containers are stackable with the same stacking direction or with opposite stacking direction is allowed thanks to the symmetrical arrangement of the gripping guides 13 on the outer bottom surface 15b with respect to the main axes of symmetry W, Y of this outer bottom surface 15b.

The production of an internally hollow body in plastic according to this invention is provided by the steps of:

a) providing a main body 4 shaped in plastic comprising side walls 6 having an inner surface 8 which defines a cavity 2 and which ends with a shaped edge 10 which delimits a coupling aperture 12 to the cavity 2;

b) providing a closure body 14, having closure side walls 16 having an outer sealing surface 18;

c) coupling said outer sealing surface 18 at least partially with the inner surface 8 of the side walls 6 of the main body 4 so as to close the cavity 2 at least partially at the coupling aperture 12 and so that an over-moulding seat 22 results between the main body 4 and the closure body 14;

d) inserting the assembly of the main body 4 and the closure body 14 obtained in step c) inside a mould 500 suitable for over-moulding a joining element 20;

e) over-moulding, by injection-moulding, the joining element 20, so as to fill the over-moulding seat 22 and weld the main body 4 to the closure body 14 at least partially along the shaped edge 10.

Preferably, the main body 4 shaped in plastic and the closure body 14 are made by injection moulding.

In one embodiment of the method, the aforementioned steps a) and b), include the following steps, in which the main body 4 and the closure body 14 are made by moulding:

ab1) providing a first main body 4' and a first closure body 14', made by moulding, housed in a half-mould 40 having a half-mould plane 42 and angularly distanced from one another in relation to a central axis of the half-mould 70 when viewed from a line of sight perpendicular to the half-mould plane 42;

ab2) picking up by means of a robotic arm the first main body 4' and the first closure body 14' from the half-mould;

ab3) aligning by means of the robotic arm a main axis of the first closure body 141' with a main axis of the main body 41' so as to permit the subsequent coupling of the first closure body 14' in the main body 4'.

Figure 3:
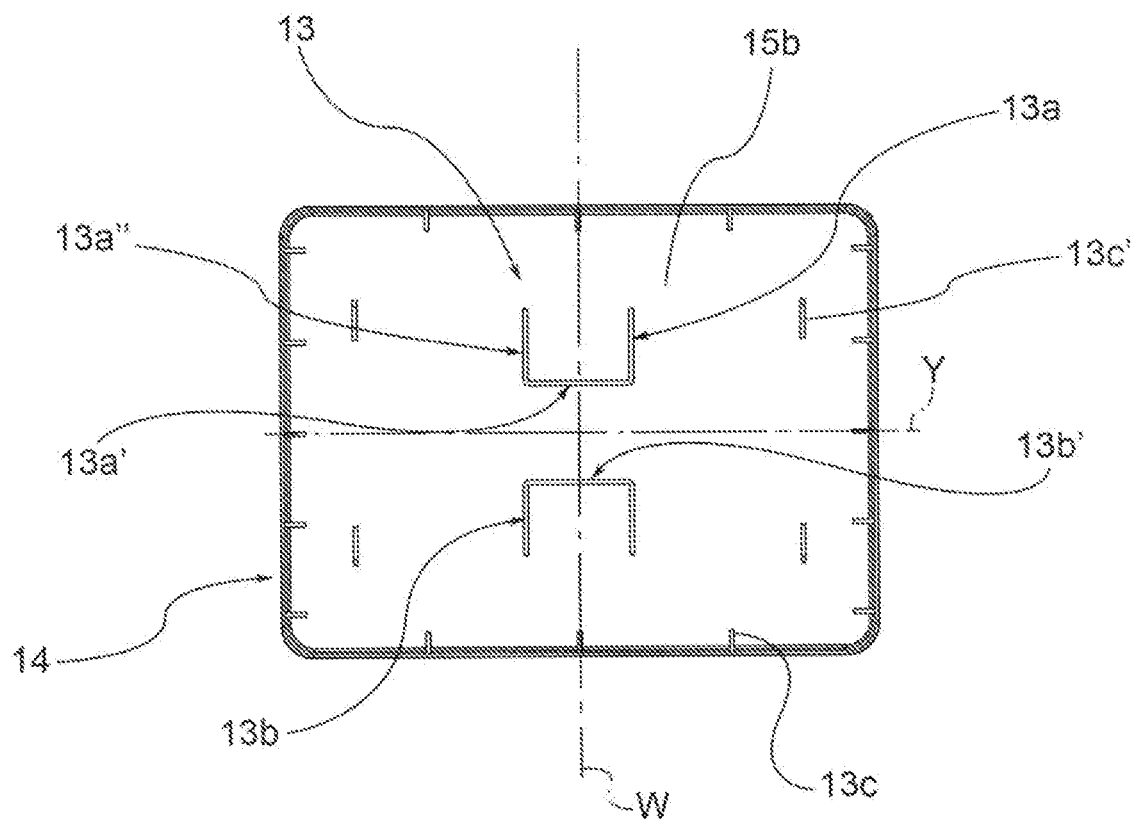
FIG. 3 is a bottom view of an internally hollow body according to an embodiment of this invention.

Main axis means the axis of each body along which occurs the subsequent correct coupling between the closure body and the main body, so as to obtain the over-moulding seat. For example, in the case of the closure body shown in FIG. 3, the main axis is the axis perpendicular to the outer bottom surface 15b and passing through the centre, i.e., to the point of intersection of the two axes W, Y.

Preferably, on the half-mould 40 are housed at least one second main body 4" and a second closure body 14", positioned in diametrically opposite ways, respectively, compared to the first main body 4' and the first closure body 14'.

The terms "first" and "second" are not intended to impose an order and even less to impose a pre-set number of main or closure bodies. It is understood, therefore, that the same method applies also to a third or a fourth body, and so on, as it is understood that the first and the second body are interchangeable with each other. Consequently, all the steps of the method described above and those following, must not be considered as constraining the presence of only one main body or only one closure body.

Preferably, the first and the second main or closure body comprise any of the structural characteristics described in the previous paragraphs.

Preferably, in step ab3) of the method for the production of the internally hollow body, the alignment of the main axis of the first closure body 141' with the main axis of the first main body 41' is performed according to the following steps:

- by means of the robotic arm, positioning the first closure body 14' so that its dimensions do not collide with the dimensions of the main body 4', for example by moving the closure body 14' in reverse in the direction perpendicular to the half-mould plane 42 moving away from the first main body 4';
- by means of the robotic arm, rotating the first closure body 14' around the main axis of the half-mould 70 to achieve an alignment of the main axis of the first closure body 141' with the main axis of the first main body 41' for the subsequent coupling step of the first closure body 14' in the first main body 4'.

Preferably, step ab3) provides for keeping the first main body 4' in position before positioning the first closure body 14' in such a way that its overall dimensions do not collide with the overall dimensions of the main body 4'.

In the case where there is the presence of more than one main body and more than one closure body, the steps described above for the alignment of the main axes are preferably performed simultaneously, for example by aligning the main axis of the first closure body 141' with the main axis of the first main body 41' and the main axis of the second closure body 141" with the main axis of the second main body 41" and so on.

Additionally, step d) requires that, in the mould coupling cavity 30 of the closure bodies 14', 14", a shaped mould 500 is at least partially inserted according to shape coupling with the mould coupling cavity 30 of the closure bodies 14', 14", in such a way that at least of the walls of the mould 51 counteracts the pressure generated on the over-moulding seat 22 by the injection means during the step e) of joining element 20 over-moulding.

Preferably, as already said, the shaped mould 500 is inserted at least partially into the mould coupling cavity 30 externally of the cavity 2 of the hollow body obtained at the end of the moulding step, i.e., it is inserted in the mould coupling cavity 30 from the side of the outer surface of the hollow body, for example from the side of the inner closure surface 17 of the closure body.

Preferably, either one of the matrix side walls 50a of the mould or one of the punch side walls 51a counteracts the pressure generated on the over-moulding seat 22 by the injection means during over-moulding step e). For example, this takes place with the main body 4 inserted in the matrix 50" and the closure body 14 inserted in the punch 50' or vice versa. In this a case, for example, the matrix wall 50a is in contact with the side walls 6 of the main body 4 and the punch wall 50a is in contact with the closure side walls 16 and, for example, one of the punch side walls 51a is in contact with the inner closure surface 17 of the closure body 14.

Figure 10:
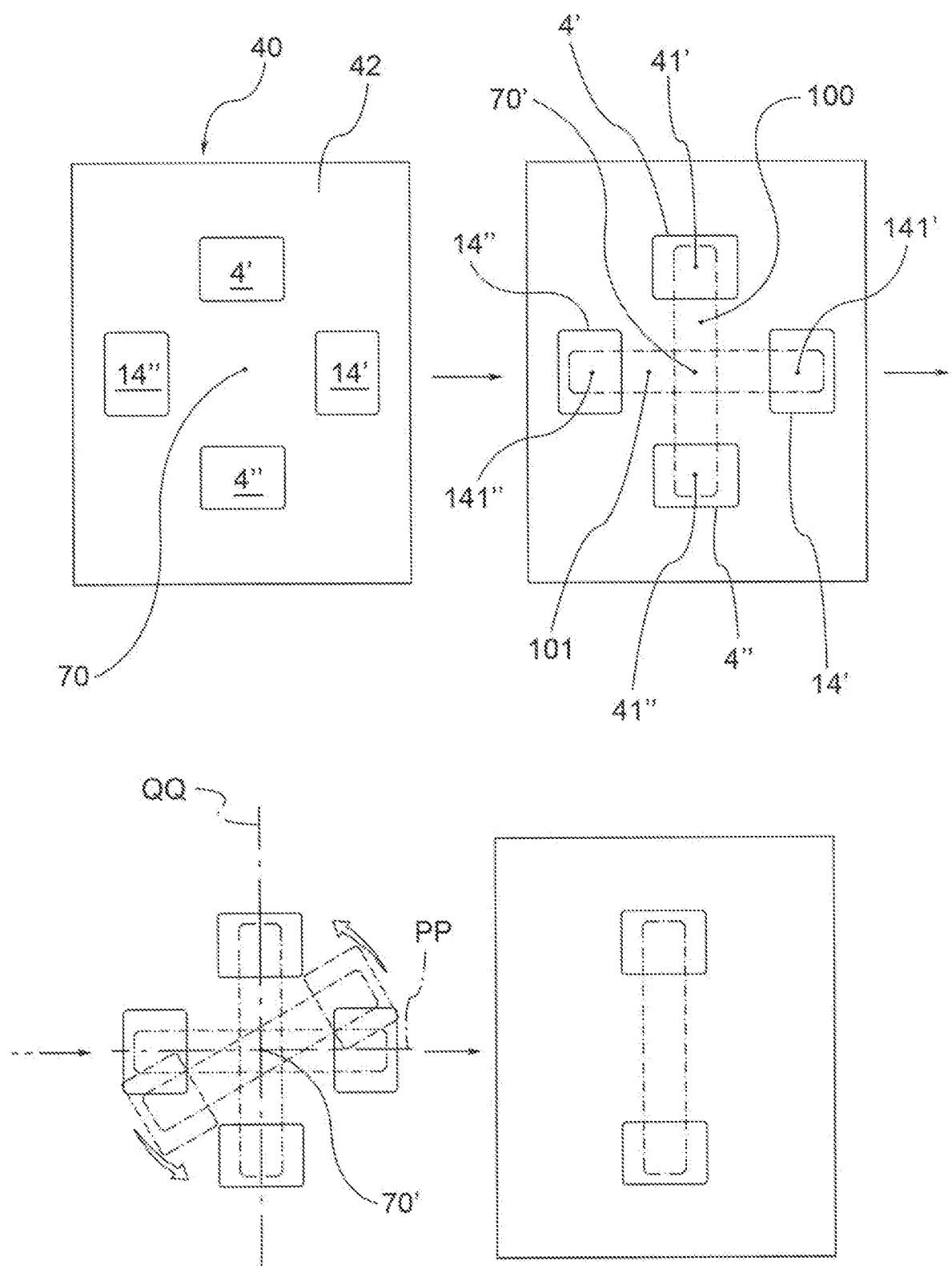
FIG. 10 shows in schematic form the steps of a manufacturing method of internally hollow bodies according to an embodiment of this invention, suitable for repeatedly and simultaneously producing a plurality of internally hollow bodies.

In an embodiment of the method, the robotic manipulator comprises at least two robotic arms 100, 101 capable of rotating relative to one another around a common rotation axis 70', preferably coaxial to the centre axis of the half-mould part 70. In this way, for example, to align the main axis of the first closure body 141' with the main axis of the first main body 41' and the main axis of the second closure body 141" with the main axis of the second main body 41", one of the two robotic arms 101, having previously picked the first and second closure body 14' and 14", performs a rotation around the common rotation axis 70', so as to bring the first and second closure body 14' and 14" respectively in correspondence of the first 4' and the second 4" main body. Preferably, the main axis of the first closure body 141' is aligned with the main axis of the first main body 41' and the main axis of the second closure body 141" with the main axis of the second main body 41". Such an operation can be performed with a plurality of robotic arms and a plurality of main bodies and closure bodies, therefore reducing and optimising the times of alignment and subsequent assembly of the closure bodies on the respective main bodies. For example, it is possible to have a robotic arm 100 wherein each main body is positioned in the vicinity of the two diametrically opposite ends of the robotic arm for each pair of main bodies and another robotic arm 101 wherein each closure body is positioned in the vicinity of the two diametrically opposite ends of the robotic arm for each pair of closure bodies, as for example shown schematically in FIG. 10.

In addition, for example, instead of positioning only one pair of main bodies or of closure bodies at the ends of the robotic arm, a plurality of main bodies are positioned along a robotic arm 100 aligned along a longitudinal axis Q-Q of the robotic arm 100 itself and on the other robotic arm 101 a plurality of closure bodies are positioned aligned along a longitudinal axis P-P of the robotic arm 101. Therefore, this plurality of main bodies is aligned to the plurality of closure bodies for the subsequent step of mutual coupling through the related handling of the two robotic arms, in the same ways already previously described for the pairs of main and closure bodies, for example by rotating one robotic with respect to the other, the latter stationary or moving.

Robotic arm means a link of a robotic manipulator having any shape, and therefore, as said, able to carry more than one main body or more than one closure body. For example, it could be a robotic arm with multiple ends arranged in a radial pattern in which each radius carries at its ends a pair of main bodies or a pair of closure bodies or carries along the entire radius a plurality of main bodies or a plurality of closure bodies.

Preferably, step c) of the method is performed with the robotic arms described above where the arm that supports the closure bodies 14', 14" translates in relation to the arm that supports the main bodies 4', 4", so as to couple the closure bodies 14', 14" in the main bodies 4', 4" and prepare them for successive step d).

Preferably, the over-moulding step e) of the joining element 20, requires that the molten synthetic resin that, once solidified, constitutes the joining element 20, be injected into the moulding seat 22 at high temperature, while the main body 4 and the closure body 14 are inserted into the over-moulding mould. In this step, when the molten resin at high temperature comes into contact with the walls of the over-moulding seat 22 (for example, the outer sealing surface 18 of the closure side walls 16, the inner surface 8 of the side walls 6, the shaped edge 10, the support edge 21), it causes a principle of fusion on the surface, i.e., a new transition of state from solid to molten form, allowing an effective and complete welding of the joining element with the main body 4 and with the closure body 14 thanks to the fusion of the materials and the subsequent re-solidification step.

Preferably, when the joining element is made of a polymer resin such as, for example, polyethylenes or polypropylenes, the temperature of the molten resin is comprised between or equal to between 140° C. and 270° C., while in the case where the resin is a polymer, such as polycarbonates or polyamides, the temperature of the molten resin is preferably comprised or equal to between 180° C. and 320° C.

Additionally, in an embodiment variant of step e), the over-moulding is performed using a second mould press, different from a first mould press with which the main body 4 and/or the closure body 14 are produced.

Preferably, in addition, the robotic manipulator, after picking up the main body 4 and the closure body 14 from the half-mould 40 performs the alignment and coupling of the main body 4 to the closure body 14 (as, for example, described in steps c) and ab3)) during the step of transporting the main body 4 and the closure body 14 towards the machine suitable for over-moulding joining element. In this way, the times are optimised and, in fact, by performing the step of alignment and coupling during the step of transferring the two bodies 14, 4 towards the over-moulding machine, a higher production efficiency is ensured.

The production method of the internally hollow body described in the previous paragraphs, preferably allows producing internally hollow bodies (for example containers) in the main industrial sectors of food, chemicals, petrochemicals, detergents, pharmaceuticals, glues, paints or solvents, ship-building or gardening.

Innovatively, the internally hollow body according to the present invention consists of two bodies (the main body and the closure body) welded together by means of a joining element, obtained by injection over-moulding, which unites them securely. Such a characteristic thus allows producing internally hollow bodies, such as containers, bottles, drums, tanks, cans, floats, buoys, or pipes using the injection moulding technique.

Advantageously, then, instead of using blow moulding or rotational moulding techniques, the hollow internally body according to this invention is obtained by means of joining parts made by injection moulding, thus allowing the widening of the range of shapes of internally hollow bodies achievable and improving the external finish. In fact, unlike blow moulding techniques, it is possible to make squared containers, having pronounced edges, not rounded or, in any case, with small bend radii, not realisable with blow moulding.

In addition, in the case of totally closed hollow bodies such as buoys or floats, the known technique of production by blow moulding includes a step in which it is necessary to seal the access hole to the internal cavity, previously used for the injection of air in the moulding step; advantageously, with the production method according to this invention, it is no longer necessary to perform the step of sealing the hole.

Advantageously, moreover, the method for the production of internally hollow bodies according to this invention, allows a high parallelisation of the moulding process, thanks to the possibility of simultaneously moulding several internally hollow bodies, and, using a robotic manipulator, moving to the next phase of over-moulding the joining element in an automated way, and thus with an improved production efficiency.

Still advantageously, the hollow bodies produced according to this invention, for example in the form of containers, are stackable in a more stable manner, thanks to the presence of flat surfaces and coupling guides that constrain the movements between the containers when stacked, difficult to achieve with blow moulding techniques. In addition, according to the invention, stacking can be performed either by stacking equal containers all oriented in the same direction or by stacking equal containers in which the surmounting container is rotated 180° around its main axis. This facilitates stacking by an operator, who does not need to be concerned with the direction of orientation.

In addition, the mass production of hollow bodies made according to this invention advantageously allows almost completely eliminating the scraps (commonly called sprues), which are created continuously and voluminously with blow moulding technology.

It is clear that one skilled in the art, in order to meet specific needs, may make changes to the hollow body, mould and production method described above, all contained within the scope of protection defined by the following claims.

The invention claimed is:

1. Internally hollow body made of plastic, having a cavity for containing liquid, solid or gaseous material, comprising:
   a main body comprising planar side walls forming a substantially rectangular periphery, having an inner surface which at least partially defines said cavity and which ends with a shaped edge which delimits a coupling aperture to the cavity;
   a closure body having a substantially rectangular periphery, comprising closure side walls having an outer sealing surface, said outer sealing surface being at least partially engaged with the inner surface of the planar side walls of the main body and said closure body at least partially closing the cavity at the coupling aperture, the closure body comprising a support edge at a bottom of the rectangular periphery and extending outwardly at least to the inner surface of the planar side walls of the main body;
   a joining element, made of plastic and having a substantially rectangular periphery;
   wherein the main body is joined to the closure body at least partially along the shaped edge by said joining element, and wherein an over-moulding seat is between the main body and the closure body, said joining element being over-moulded to a lower edge of the main body and to a periphery of the closure side walls of the closure body and covering said over-moulding seat;
   wherein the closure body has a mould coupling cavity, and wherein the mould coupling cavity is configured for at least partially coupling to a mould with a shaped coupling configured to counteract pressure generated on the over-moulding seat, and wherein the mould coupling cavity is formed externally of the hollow body;
   wherein the mould coupling cavity is delimited by an inner closure surface of the closure side walls of the closure body, said inner closure surface being opposite to the outer sealing surface towards the mould coupling cavity and configured to maintain engagement between the outer sealing surface of the closure body and the inner surface of the planar side walls of the main body;
   a bottom wall having an upper bottom surface, the upper bottom surface facing the cavity of the container and forming an inner bottom surface of the container, the bottom wall having an outer bottom surface, opposite to the upper bottom surface and facing downward towards an outside of the container;
   wherein the mould coupling cavity has a truncated pyramid shape with planar side walls and a minor base formed by the outer bottom surface, wherein the minor base is an abutment surface, configured to abut a portion of the mould, and wherein the planar side walls of the truncated pyramid are the inner closure surface configured to engage walls of the mould; and
   wherein the outer bottom surface extends to a height of the internally hollow body higher than a height of the shaped edge, said height being measured along a main axis of the internally hollow body.

2. Internally hollow body made of plastic according to claim 1, wherein the closure body completely seals the cavity at the coupling aperture.

3. Internally hollow body made of plastic according to claim 1, wherein the internally hollow body is a container.

4. Internally hollow body made of plastic according to claim 3, wherein said container is a jar, or a barrel, or a jerry can, or a flask, or a bin, or a tank, or a cistern or a bottle, or a float, or a buoy, or a lifebuoy, or a fender.

5. Internally hollow body made of plastic according to claim 4, wherein the closure body is a bottom or a lid of the jar, or of the barrel, or of the jerry can, or of the flask, or of the bin, or of the tank, or of the cistern or of the bottle.

6. Internally hollow body made of plastic according to claim 3, wherein on the main body or on the closing body a groove is made, having two gripping seats, configured to accommodate fingers of a hand and wherein between the two gripping seats is a handle joined to the planar side walls of the main body or the closure body.

7. Internally hollow body made of plastic according to claim 6, wherein the closure body or the main body, comprises a bottom wall, having an upper bottom surface, which faces the cavity of the container and forms an inner bottom surface of the container and an outer bottom surface, facing towards an outside of the container and wherein coupling guides are made on the outer bottom surface which extend downwards, in a direction opposite to the upper bottom surface towards the outside of the container, said coupling guides being complementary to at least a part of surfaces of the handle and/or at least a part of seat walls which delimit the gripping seats and/or at least a part of surfaces of the upper or planar side walls of an adjacent container when stacked on top of one another and forming substantially continuous stacked planar side walls.

8. Internally hollow body made of plastic according to claim 3, wherein the container is stackable on a second container in a stable manner both in a same stacking direction and in an opposite stacking direction, with the overlying container rotated by 180° with respect to the container immediately below.

9. Internally hollow body made of plastic according to claim 1, wherein the inner closure surface is facing the side opposite to the cavity of the main body.

10. Internally hollow body made of plastic according to claim 1, wherein the mould coupling cavity comprises an abutment surface abutting a portion of the mould and the planar side walls forming the inner closure surface for engaging at least one wall of the mould, at least partially, to counteract pressure.

11. Internally hollow body made of plastic according to claim 10, wherein the abutment surface abuts a wall of a punch or matrix.

12. Internally hollow body made of plastic according to claim 1, wherein the joining element is made of a plastic material to melt and weld with the plastic material which the main body or the closure body is made of.

13. Internally hollow body made of plastic according to claim 1, wherein the plastic is selected from the group consisting of: polyethylenes or polypropylenes or methacrylates or polycarbonates or polyamides.

14. Internally hollow body made of plastic according to claim 1, wherein the outer sealing surface of the closure side walls comprises a plurality of spaced apart protrusions extending outward from the side walls of the closure body above the joining element and engage the inner surface of the planar side walls of the main body.

15. Internally hollow body made of plastic according to claim 14, wherein at a coupling zone between the main body and the closure body, the outer sealing surface of the closure side walls forms a sealing step which projects in an opposite direction to the inner closure surface and which couples with a respective wall step made on the planar side walls of the main body.

16. Internally hollow body made of plastic according to claim 1, wherein the joining element annularly surrounds the internally hollow body made of plastic, creating a welding and sealing ring between the main body and the closure body.

17. Internally hollow body made of plastic according to claim 1, wherein at least one out of the main body and the closure body comprise an injection moulded element.

18. Internally hollow body made of plastic according to claim 1, wherein the mould coupling cavity of the closure body has inner side wall surfaces complementary to upper portions of outer surfaces of the side walls of the main body.

19. Internally hollow body made of plastic according to claim 1, wherein the closure side walls form a support step, having a tread surface facing toward the shaped edge and extending perpendicularly or at an incline to the outer sealing surface and in contact with a wall of the joining element.

20. Internally hollow body made of plastic, having a cavity for containing liquid, solid or gaseous material, comprising:
   a main body comprising planar side walls forming a substantially rectangular periphery, having an inner surface which at least partially defines said cavity and which ends with a shaped edge which delimits a coupling aperture to the cavity;
   a closure body having a substantially rectangular periphery, comprising closure side walls having an outer sealing surface, said outer sealing surface being at least partially engaged with the inner surface of the planar side walls of the main body and said closure body at least partially closing the cavity at the coupling aperture, the closure body comprising a support edge at a bottom of the rectangular periphery and extending outwardly at least to the inner surface of the planar side walls of the main body;
   a joining element, made of plastic and having a substantially rectangular periphery;
   wherein the main body is joined to the closure body at least partially along the shaped edge by said joining element, and wherein an over-moulding seat is between the main body and the closure body, said joining element being over-moulded to a lower edge of the main body and to a periphery of the closure side walls of the closure body and covering said over-moulding seat;
   wherein the closure body has a mould coupling cavity, and wherein the mould coupling cavity is configured for at least partially coupling to a mould with a shaped coupling configured to counteract pressure generated on the over-moulding seat, and wherein the mould coupling cavity is formed externally of the hollow body;
   wherein the mould coupling cavity is delimited by an inner closure surface of the closure side walls of the closure body, said inner closure surface being opposite to the outer sealing surface towards the mould coupling cavity and configured to maintain engagement between the outer sealing surface of the closure body and the inner surface of the planar side walls of the main body;

wherein the internally hollow body comprises a container;
wherein on the main body or on the closing body a groove is formed, having a first gripping seat and a second gripping seat, configured to accommodate fingers of a hand and wherein between the first and second gripping seats is a handle joined to the planar side walls of the main body or the closure body, the handle comprising a first gripping side surface and a second gripping side surface, the first gripping side surface facing the first gripping seat and the second gripping side facing the second gripping seat; each of the gripping seats comprising a first seat wall and a second opposite seat wall connecting the first and second gripping side surfaces of the first and second gripping seats;
a first gripping guide and a second gripping guide formed in the bottom of the container, each of the first and second gripping guides comprising a first guide wall, a second wall and a third guide wall extending downward and arranged in a C-shape; wherein when stacked, the first guide wall of the first gripping guide engages the first gripping side surface and the second guide wall of the second gripping guide engages the second gripping side surface, and wherein the second walls of the first gripping guide and of the second gripping guide are engage one of the first and second gripping side surface of the gripping seats when stacked.

21. Internally hollow body made of plastic according to claim 20, further comprising first and second seat constraint elements, wherein the seat constraint elements are configured to engage the other one of the first and second gripping side surface of the gripping seats when stacked.

22. Internally hollow body made of plastic according to claim 20, further comprising rest walls at a periphery on the bottom surface configured to engage an outer surface of the side walls of an underlying body when stacked.

* * * * *